(12) United States Patent
Piorkowski (10) Patent No.: US 9,770,947 B1
(45) Date of Patent: Sep. 26, 2017

(54) AXLE-SHAFT SYSTEM WITH TWO-STAGE STIFFNESS AND SIDE-TO-SIDE STIFFNESS BIAS

(71) Applicant: GM GLOBAL TECHNOLOGY OPERATIONS LLC, Detroit, MI (US)

(72) Inventor: Paul A. Piorkowski, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/136,055

(22) Filed: Apr. 22, 2016

(51) Int. Cl.
  *B60K 17/24* (2006.01)
  *B60B 35/14* (2006.01)
  *B60B 27/00* (2006.01)

(52) U.S. Cl.
  CPC .......... *B60B 35/14* (2013.01); *B60B 27/0026* (2013.01); *B60B 2900/311* (2013.01)

(58) Field of Classification Search
  CPC ........ F16C 1/02; F16C 3/023; F16C 2326/06; F16D 3/10; F16D 47/02; F16D 1/0858; F16D 3/72; F16D 7/025; F16D 2001/102; F16D 2300/10; B60K 17/22; F16F 7/08; F16F 1/00
  USPC ......... 180/380, 385; 464/97; 301/124.1, 126
  See application file for complete search history.

(56) References Cited

U.S. PATENT DOCUMENTS

| | | | |
|---|---|---|---|
| 2,590,169 A | 3/1952 | Fritz | |
| 2,734,359 A | 2/1956 | Mulheim et al. | |
| 4,127,080 A | 11/1978 | Lakiza et al. | |
| 4,600,072 A * | 7/1986 | Krude | B60G 3/225 180/348 |
| 5,354,237 A * | 10/1994 | Amborn | F16C 3/02 464/180 |
| 5,409,255 A * | 4/1995 | Alatalo | B60G 21/051 228/144 |
| 5,672,111 A | 9/1997 | Schremmer et al. | |
| 6,523,841 B2 * | 2/2003 | Glaser | B60B 35/006 280/124.106 |
| 7,425,006 B2 * | 9/2008 | Worman, Jr. | B60G 21/051 180/233 |
| 7,862,058 B2 * | 1/2011 | Bubulka | B60B 35/003 280/124.125 |
| 2004/0011584 A1 * | 1/2004 | Henkel | B60K 17/22 180/312 |
| 2007/0267245 A1 * | 11/2007 | Rodriguez | B60K 17/22 180/380 |

(Continued)

*Primary Examiner* — Toan To
(74) *Attorney, Agent, or Firm* — Quinn IP Law (57) ABSTRACT

An axle-shaft system for transmitting torque in a motor vehicle drive-train includes first and second two-stage stiffness axle-shafts. Each axle-shaft includes a hollow cylinder having first and second ends and a hollow cylinder stiffness. The axle-shaft also includes an inner shaft extending through the hollow cylinder, and having first and second ends and an inner shaft stiffness. The inner shaft's and the hollow cylinder's first ends are engaged via a rotational clearance fit. The inner shaft's and the hollow cylinder's second ends are rotationally fixed to permit the inner shaft's first end to twist relative to the inner shaft's second end. The inner shaft's stiffness defines the axle-shaft's first-stage stiffness, while the inner shaft's and the hollow cylinder's combined stiffness defines the axle-shaft's second-stage stiffness. At least one of the first-stage and second-stage stiffness of the first axle-shaft is dissimilar from the respective stiffness of the second axle-shaft.

20 Claims, 5 Drawing Sheets

(56) References Cited

U.S. PATENT DOCUMENTS

| | | | |
|---|---|---|---|
| 2010/0216557 A1* | 8/2010 | Nakagawa | B60B 27/0005 464/140 |
| 2011/0209961 A1 | 9/2011 | Yamamoto et al. | |
| 2015/0352922 A1* | 12/2015 | Kawachi | B60G 21/051 280/124.128 |
| 2016/0097420 A1* | 4/2016 | Grimmer | F16C 1/02 464/97 |
| 2016/0153501 A1* | 6/2016 | Nishida | C08L 77/06 464/162 |
| 2016/0238083 A1* | 8/2016 | Piorkowski | F16D 3/12 |

\* cited by examiner

AXLE-SHAFT SYSTEM WITH TWO-STAGE STIFFNESS AND SIDE-TO-SIDE STIFFNESS BIAS

TECHNICAL FIELD

The disclosure relates to an axle-shaft system with two-stage stiffness and side-to-side stiffness bias for transmitting torque in a motor vehicle.

BACKGROUND

An axle-shaft or half-shaft, is a mechanical component used for transmitting rotation and torque from a powerplant in a drive-train of a vehicle. Axle-shafts are typically used to connect a vehicle differential to driven wheels. Loads on an axle-shaft are mainly the result of engine output torque overlaid with the engine's torsional vibrations, and the vehicle's inertia. Axle-shafts are generally constructed to withstand operating stresses, while limiting additional weight and inertia. Vehicle axle-shafts frequently incorporate one or more mechanical joints designed to permit variation in alignment and/or distance between the driving and driven components.

SUMMARY

An axle-shaft system for transmitting an input torque in a drive-train of a motor vehicle includes a first two-stage stiffness axle-shaft and a second two-stage stiffness axle-shaft. Each of the first two-stage stiffness axle-shaft and the second two-stage stiffness axle-shaft includes a hollow cylinder defined by a longitudinal axis, a first end, a distal second end, and having a hollow cylinder stiffness. Each of the first two-stage stiffness axle-shaft and the second two-stage stiffness axle-shaft also includes an inner shaft extending through the hollow cylinder along the longitudinal axis and defined by a first end, a distal second end, and having an inner shaft stiffness.

Each of the first two-stage stiffness axle-shaft and the second two-stage stiffness axle-shaft is constructed such that the first end of the respective inner shaft is engaged with the first end of the respective hollow cylinder via a rotational clearance fit. Also, in each of the first two-stage stiffness axle-shaft and the second two-stage stiffness axle-shaft the second end of the respective inner shaft is rotationally fixed to the second end of the respective hollow cylinder such that the first end of the inner shaft will twist to a predetermined angle with respect to the second end of the inner shaft in response to the input torque. The inner shaft stiffness defines a first-stage stiffness of the axle-shaft and the inner shaft stiffness together with the hollow cylinder stiffness defines a second-stage stiffness of the axle-shaft. At least one of the first-stage stiffness and the second-stage stiffness of the first axle-shaft is dissimilar, i.e., separate and distinct, from the respective one of the first-stage stiffness and the second-stage stiffness of the second axle-shaft. Accordingly, the axle-shaft system has a stiffness bias or asymmetrical stiffness between the two axle-shafts.

The stiffness of the first inner shaft may be dissimilar from the stiffness of the second inner shaft. Specifically, the diameter and/or the material of the first inner shaft may be distinct from the same of the second inner shaft. The difference in stiffness may be greater than 10% between the subject inner shafts.

The stiffness of the first hollow cylinder may be dissimilar from the stiffness of the second hollow cylinder. Specifically, the outer diameter, the inner diameter, and/or the material of the first hollow cylinder may be dissimilar from the same of the second hollow cylinder. The difference in stiffness may be greater than 10% between the subject hollow cylinders.

At least one of the first two-stage stiffness axle-shaft and the second two-stage stiffness axle-shaft may also include a first damping element arranged between the inner shaft and the hollow cylinder and configured to control variation in the input torque transmitted by the axle-shaft via generated damping. In other words, the first damping element may dissipate energy stored in relative movement between the inner shaft and the hollow cylinder as a result of the variation in input torque. The first damping element may also generate a gradual transition between the first-stage stiffness and the second-stage stiffness.

When each of the first two-stage stiffness axle-shaft and the second two-stage stiffness axle-shaft includes the respective first damping element, the damping generated by the first damping element of the first inner shaft may be dissimilar from the damping generated by the first damping element of the second inner shaft.

At least one of the first two-stage stiffness axle-shaft and the second two-stage stiffness axle-shaft may be constructed such that the first end of the inner shaft includes a first outer spline and the first end of the hollow cylinder includes a first inner spline. In such a case, the first outer spline may be engaged with the first inner spline via the rotational clearance fit at a first interface.

At least one of the first two-stage stiffness axle-shaft and the second two-stage stiffness axle-shaft may also include a second damping element arranged between the first outer spline and the first inner spline. In such a case, the second damping element may be an elastomer component occupying the rotational clearance fit and configured to control variation in the input torque transmitted by the axle-shaft at the first interface via generated damping.

When each of the first two-stage stiffness axle-shaft and the second two-stage stiffness axle-shaft includes the respective second damping element, the damping generated by the second damping element of the first inner shaft may be dissimilar from the damping generated by the second damping element of the second inner shaft.

At least one of the first two-stage stiffness axle-shaft and the second two-stage stiffness axle-shaft may be constructed such that the second end of the inner shaft includes a second outer spline and the second end of the hollow cylinder includes a second inner spline. In such a case, the second outer spline may be press-fit into the second inner spline at a second interface.

At least one of the first two-stage stiffness axle-shaft and the second two-stage stiffness axle-shaft may also be constructed such that the second end of the inner shaft is welded to the second end of the hollow cylinder.

A motor vehicle drivetrain employing a differential operatively connected to such an axle-shaft system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
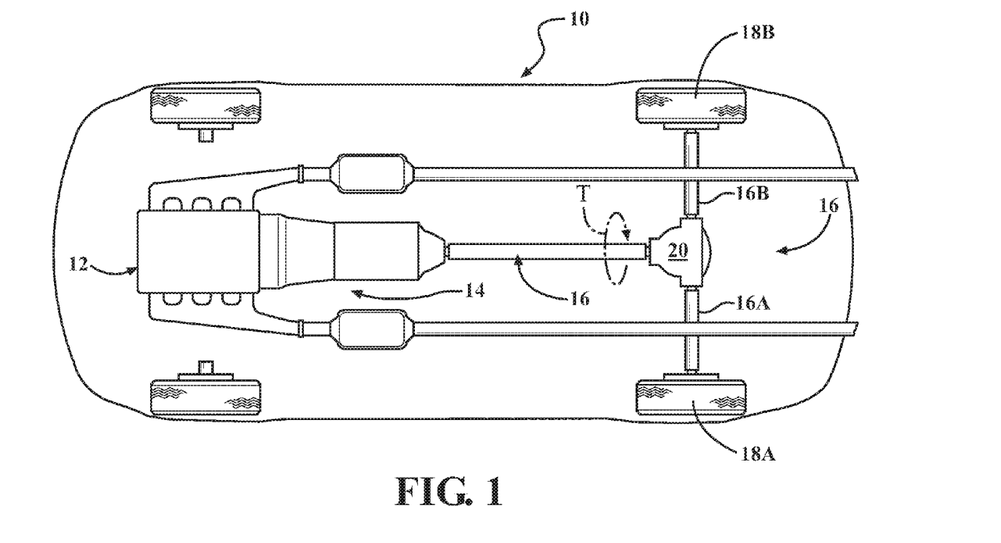
FIG. 1 is a schematic illustration of a motor vehicle drive-train including an axle-shaft system employing two-stage stiffness axle-shafts according to the disclosure.

Referring to the drawings, wherein like reference numbers refer to like components, FIG. 1 shows a schematic view of a motor vehicle 10 which includes a drive-train adapted for propelling the vehicle. The drive-train includes a power-plant 12, a transmission 14, and includes a two-stage stiffness axle-shaft system 16 for transmitting power-plant torque T directed through the transmission and received by a differential 20 to a first driven road wheel 18A and a second driven road wheel 18B. The power-plant 12 can be an internal combustion engine, an electric motor(s), a fuel cell, or any combination of the above.

The two-stage stiffness axle-shaft system 16 includes a first axle-shaft 16A and a second axle-shaft 16B. Although the first axle-shaft 16A is shown on a specific side of the differential 20 and the second axle-shaft 16B is shown on the opposite side thereof, nothing precludes positioning of the two axle-shafts from being switched in the vehicle 10 to achieve desired results that will be described below. The differential 20 is configured to receive the power-plant torque T and distribute such torque among the first axle-shaft 16A and the second axle-shaft 16B for propelling the vehicle 10. As such, the axle-shaft system 16 is operatively connected to and configured to transmit the torque T from the differential 20 to the first and second road wheels 18A, 18B. Specifically, the first axle-shaft 16A receives a portion of the torque T and transmits that torque portion to the first drive road wheel 18A, while the second axle-shaft 16B receives another portion of the torque T and transmits that other torque portion to the second road wheel 18B.

Figure 2:
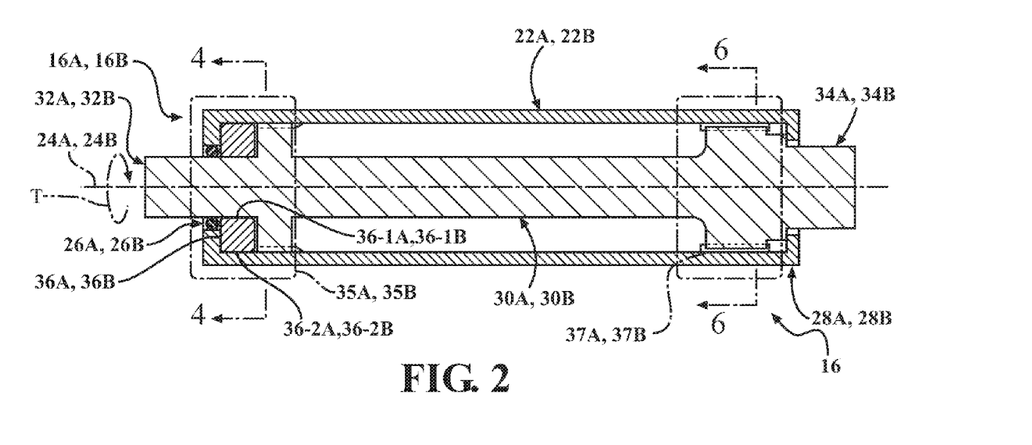
FIG. 2 is a schematic close-up cross-sectional illustration of an embodiment of a representative two-stage stiffness axle-shaft depicted in FIG. 1, the axle-shaft having an inner shaft extending through and engaging a hollow cylinder at first and second interfaces.
Figure 3:
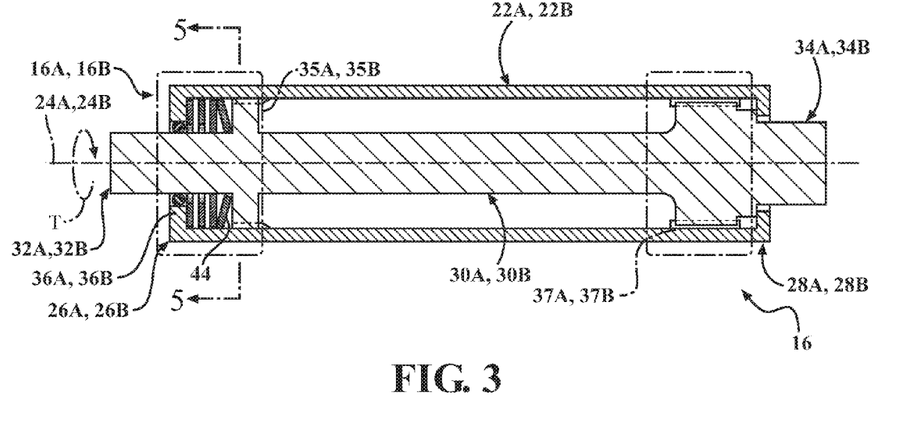
FIG. 3 is a schematic close-up cross-sectional illustration of another embodiment of the representative two-stage stiffness axle-shaft depicted in FIG. 1, the axle-shaft having an inner shaft extending through and engaging a hollow cylinder at first and second interfaces.

As shown in FIGS. 2 and 3, each of the axle-shafts 16A and 16B is configured to control, i.e., absorb, filter, and/or attenuate, variations in power-plant torque T, and includes a respective hollow cylinder 22A, 22B. Each hollow cylinder 22A, 22B is defined by a respective longitudinal axis 24A, 24B, a first end 26A, 26B, and a distal second end 28A, 28B. Each hollow cylinder 22A and 22B also has a hollow cylinder stiffness. In general, as understood by those skilled in the art, stiffness or rigidity is the extent to which a specific object resists deformation in response to an applied force, and, in the International System of Units, is typically measured in newtons per meter (N/m). Each of the axle-shafts 16A and 16B also includes an individual inner shaft 30A, 30B extending through the respective hollow cylinder 22A, 22B along the respective longitudinal axis 24A, 24B.

Figure 7:
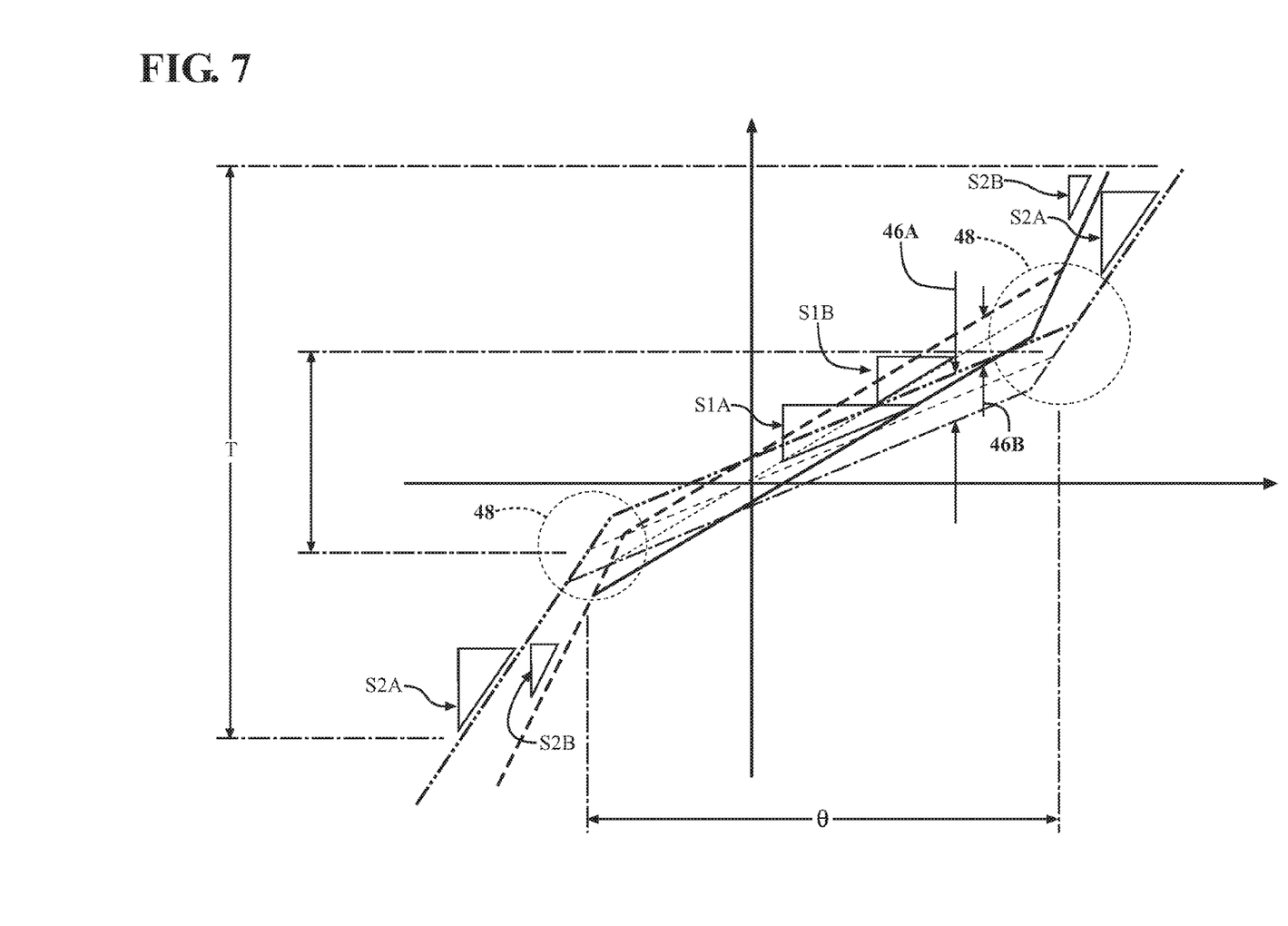
FIG. 7 is a graph of an angle of twist versus input torque for the first and second two-stage stiffness axle-shafts depicted in FIG. 1.

Each inner shaft 30A, 30B is defined by a respective first end 32A, 32B, a distal second end 34A, 34B, and has an inner shaft stiffness. Additionally, each inner shaft 30A, 30B may have an optional hollow construction. In each respective axle-shaft 16A and 16B, the first end 32A, 32B of the inner shaft 30A, 30B is engaged with the first end 26A, 26B of the hollow cylinder 22A, 22B via a respective rotational clearance fit 33A, 33B (shown in FIG. 4) at a respective first interface 35A, 35B. The stiffness of the inner shaft 30A defines a respective first-stage stiffness or spring factor S1A of the axle-shaft 16A, while the stiffness of the inner shaft 30B defines a respective first-stage stiffness or spring factor S1B of the axle-shaft 16B as shown in FIG. 7. Additionally, the combined stiffness of the inner shaft 30A and of the hollow cylinder 22A defines a second-stage stiffness or spring factor S2A of the axle-shaft 16A, while the combined stiffness of the inner shaft 30B and of the hollow cylinder 22B defines a second-stage stiffness or spring factor S2B of the axle-shaft 16B, as also shown in FIG. 7.

As shown, each second end 34A, 34B of the inner shafts 30A, 30B is rotationally fixed to the respective second end 28A, 28B of the hollow cylinder 22A, 22B. The fixed connection of the inner shafts 30A, 30B to the hollow cylinders 22A, 22B at the respective second ends 34A, 34B and 28A, 28B facilitate twisting of the inner shaft 30, i.e., angular displacement of the first ends 32A, 32B with respect to the respective second ends 34A, 34B in response to received input power-plant torque T of sufficient magnitude transmitted via the differential 20. The maximum twist of each inner shaft 30A, 30B is defined by the rotational clearance fit 33A, 33B between the first ends 32A, 32B and 26A, 26B of the respective inner shaft 30A, 30B and hollow cylinder 22A, 22B, and is limited to a predetermined angle θ (shown in FIG. 7). Each of the hollow cylinders 22A, 22B and the inner shafts 30A, 30B may be constructed from a high strength formable material, such as aluminum or steel, and be reinforced for additional stiffness with a material such as carbon fiber. Accordingly, the second-stage stiffnesses S2A and S2B of the respective axle-shaft 16A and the axle-shaft 16B are attained after the respective inner shaft 30A, 30B experiences maximum twist that is defined by the appropriate rotational clearance fit 33A, 33B.

Figure 8:
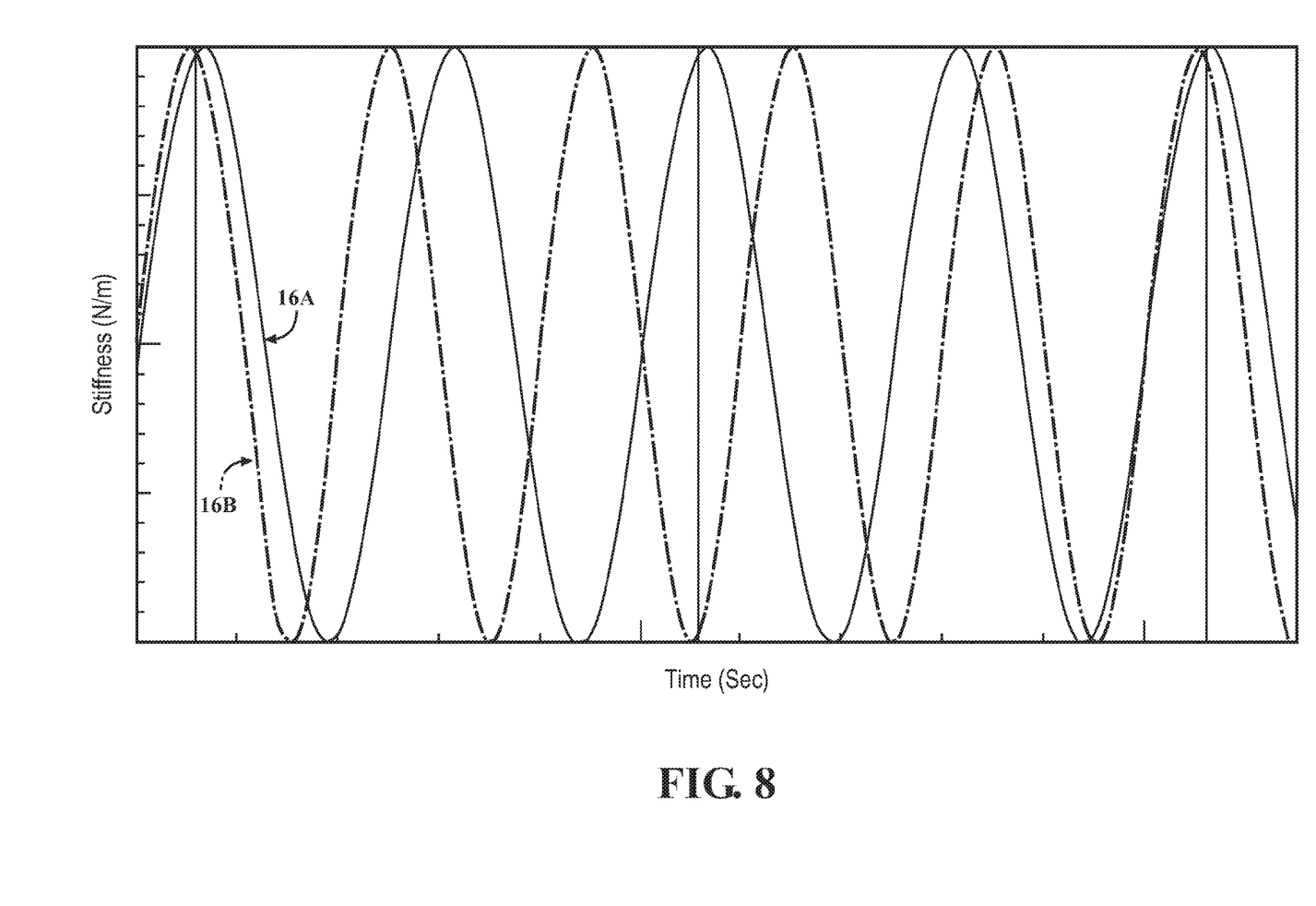
FIG. 8 is a graph illustrating asymmetrical torsional response from the respective two-stage stiffness axle-shafts of the axle-shaft system depicted in FIG. 1 under typical power hop conditions.

During operation of the vehicle 10, power-plant torque T distributed by the differential 20 between the first axle-shaft 16A and the second axle-shaft 16B can give rise to an undesirable phenomenon called "wheel hop" or "power hop". In general, wheel hop or power hop is a resonant vibration or shaking of the vehicle during vehicle acceleration as a result of the road wheels losing and regaining traction in quick succession. By constructing the first axle-shaft 16A and second axle-shaft 16B with different stiffnesses, wheel hop can be minimized. As shown in FIG. 8, torsional response of the two-stage stiffness axle-shaft 16A is out of phase with respect to the torsional response of the two-stage stiffness axle-shaft 16B. Because energy input into the drive-train and overall structure of the vehicle 10 from each axle-shaft 16A and 16B is additive, such an out of phase condition limits amplitude of the total energy absorbed during power hop by the vehicle drive-train and structure. Consequently, the subject out of phase condition also attenuates the perception of power hop by passengers of the vehicle 10.

In order to minimize occurrence and/or magnitude of power hop described above, at least one of the first-stage stiffness S1A and the second-stage stiffness S2A of the first axle-shaft 16A is dissimilar from the respective first-stage stiffness S1B and the second-stage stiffness S2B of the second axle-shaft 16B. Such dissimilar construction of the first and second axle-shafts 16A, 16B provides the axle-shaft system 16 with a side-to-side stiffness bias in the vehicle 10. Specifically, the stiffness of the first inner shaft 30A can be dissimilar from the stiffness of the second inner shaft 30B, i.e., have a different spring rate. To achieve an appropriate dissimilarity between the respective stiffnesses of the first and second inner shafts 30A, 30B, the difference in subject stiffnesses can be greater than 10%. To achieve a desired difference in the subject stiffnesses between the first and second inner shafts 30A, 30B, an outer diameter and/or material of the respective inner shafts can be specifically selected. In the event optional hollow construction for either of the inner shafts 30A, 30B is used, the inner diameter of the subject shaft may be varied to adjust the stiffness thereof and achieve the desired difference in the subject stiffnesses between the first and second inner shafts 30A, 30B.

Similarly, in order to appropriately differentiate between the second-stage stiffness S2A of the first axle-shaft 16A the second-stage stiffness S2B of the second axle-shaft 16B to reduce power hop, the first hollow cylinder 22A and the second hollow cylinder 22B can be constructed to have a dissimilar spring rate. In other words, the stiffness of the first hollow cylinder 22A can be dissimilar from the stiffness of the second hollow cylinder 22B. The difference in the subject stiffnesses can be greater than 10%. To achieve a desired difference in the subject stiffnesses, an outer diameter, inner diameter, and/or material of the respective hollow cylinders 22A, 22B can be specifically selected.

Figure 4:
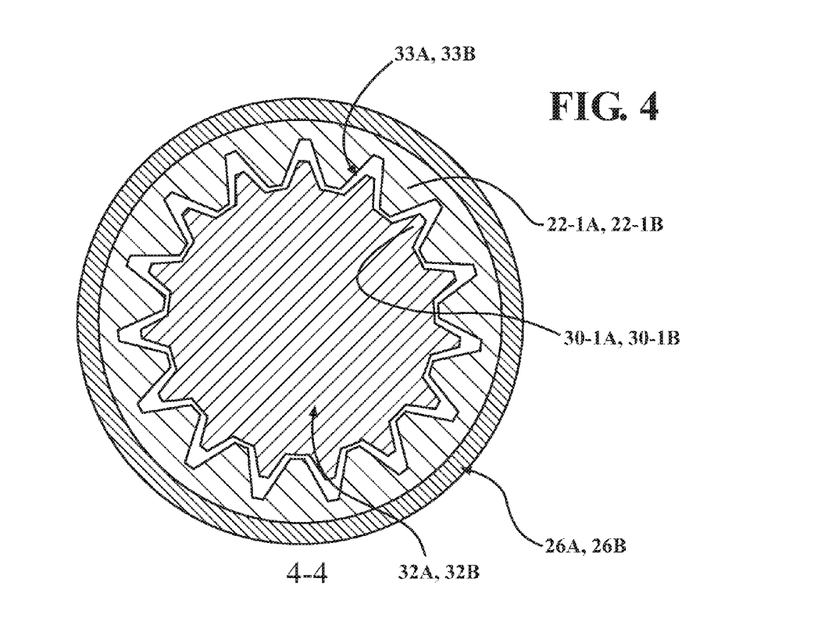
FIG. 4 is a schematic close-up illustration of an embodiment of a section through a first interface between the inner shaft and the hollow cylinder in the representative two-stage stiffness axle-shaft depicted in FIGS. 2 and 3.
Figure 5:
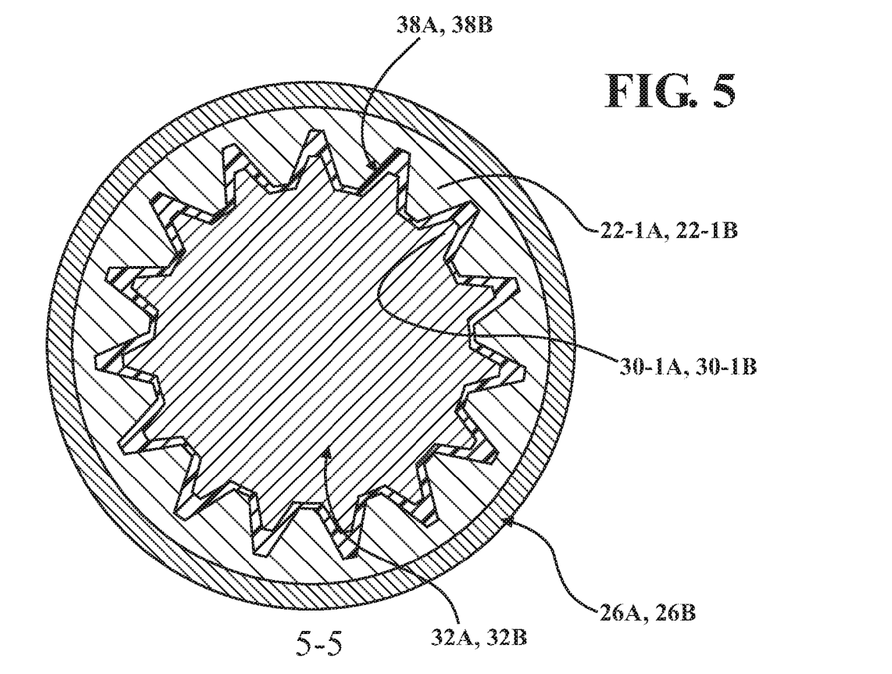
FIG. 5 is a schematic close-up illustration of another embodiment of a section through the first interface depicted in FIGS. 2 and 3.

As shown in section 4-4 illustrated in FIG. 4 and section 5-5 illustrated in FIG. 5, each first end 32A, 32B of the inner shafts 30A, 30B may include a first outer spline 30-1A, 30-1B and the first end 26 of the hollow cylinder 22 may include a first inner spline 22-1A, 22-1B. As shown, the first outer spline 30-1A, 30-1B of the inner shaft 30A, 30B and the respective first inner spline 22-1A, 22-1B of the hollow cylinder 22A, 22B are engaged such that a predetermined amount of lash is established in each case therebetween. Accordingly, the rotational clearance fit 33A and 33B at the respective first ends 32A, 32B and 26A, 26B may be established via the lash in the engagement between the first outer spline 30-1A, 30-1B and the first inner spline 22-1A, 22-1B, such that the maximum twist of the respective inner shaft 30A, 30B is limited to the predetermined angle θ. A specific portion of the rotational clearance fit 33A, 33B may be established between adjacent faces of the respective first outer spline 30-1A, 30-1B and the first inner spline 22-1A, 22-1B on each of the drive torque, i.e., torque T in positive direction, and coast torque, i.e., torque T in negative direction, sides of the spline engagement. Such specific portions of the rotational clearance fit 33A, 33B allocated between the drive and coast sides of the engagement of splines 30-1A, 30-1B and 22-1A, 22-1B may be established specifically for each first axle-shaft 16A and second axle-shaft 16B via numerical computations and/or empirical analysis, while the predetermined angle θ is indicative of the entire clearance fit 33A, 33B, as may be seen in FIG. 7.

In each of the first and second axle-shafts 16A, 16B a respective first damping element 36A, 36B may be arranged between the inner shaft 30A, 30B and the respective hollow cylinder 22A, 22B. Each first damping element 36A, 36B is configured to control variation in the input torque T transmitted by the respective first and second axle-shafts 16A, 16B via generated damping. In other words, the first damping element 36A, 36B dissipates energy stored in relative movement, i.e., oscillations, between the inner shaft 30A, 30B and the respective hollow cylinder 22A, 22B as a result of the variation in input torque T. Additionally, the first damping element 36A, 36B is configured to generate a gradual shift, in other words, smooth out a transition 48A, 48B between the first-stage stiffness S1A, S1B and the second-stage stiffness S2A, S2B, which will be discussed in detail below. As shown in FIG. 2, each first damping element 36A, 36B may be configured as an elastomer component, for example shaped or molded from a specifically formulated rubber compound having a respective internal hysteresis 46A, 46B. As shown, each first damping element 36A, 36B has a respective inner diameter 36-1A, 36-1B and an outer diameter 36-2A, 36-2B. In order to achieve and maintain a preset connection between the hollow cylinder 22A, 22B, the elastomer first damping element 36A, 36B, and the inner shaft 30A, 30B, the first damping element may be bonded to the respective inner shaft at the inner diameter 36-1A, 36-1B and to the hollow cylinder at the outer diameter 36-2A, 36-2B.

The internal hysteresis 46A, 46B of each elastomer first damping element 36A, 36B is the energy dissipated due to the subject material's internal friction, and is generally shown as an area in the center of a force versus extension plot in FIG. 7. Accordingly, the elastomer first damping element 36A, 36B can achieve dual function of springing and damping because the subject material's pronounced hysteresis does not return all the absorbed compression energy on the rebound. Additionally, elastic hysteresis may be dependent on rate of loading, for example, elastic hysteresis may be more pronounced in elastomers when the loading and unloading is done quickly than when it is done slowly.

In a separate embodiment shown in FIG. 5, the first damping element 36A and/or 36B may be configured as a friction component. The friction component first damping element 36A, 36B may be preloaded to generate a friction force between the inner shaft 30A, 30B and the respective hollow cylinder 22A, 22B, and thus provide appropriate friction hysteresis (shown in FIG. 7) 46A, 46B and damping to control oscillations between the specific inner shaft and the hollow cylinder. As shown, the friction component first damping element 36A, 36B may be arranged inside the hollow cylinder 22A, 22B and be preloaded via an elastic element 44, such as a spring. The friction component embodiment of the first damping element 36A, 36B may be configured as one or more friction washers arranged in series. Each of such friction washers may be configured from graphite or any other appropriate material that is capable of providing stable friction characteristics under a wide range of operating conditions of the vehicle 10.

In the embodiment where the first two-stage stiffness axle-shaft 16A and the second two-stage stiffness axle-shaft 16B include the respective first damping elements 36A, 36B, the damping generated by the selected first damping element 36A of the first inner shaft 30A may be dissimilar from the damping generated by the selected first damping element 36B of the second inner shaft 30B. Accordingly, different characteristics specifically selected for the first damping elements 36A, 36B may be used to additionally affect response of the axle-shaft system 16 with respect to minimizing power hop.

Additionally, as shown in section 5-5 illustrated in FIG. 5, a second damping element 38A, 38B may be arranged between the first outer spline 30-1A, 30-1B and the respective first inner spline 22-1A, 22-1B and configured to control variation in the input torque T transmitted by the specific axle-shaft 16A or 16B at the first interface 35A, 35B via generated damping. The second damping element 38A, 38B may be an elastomer component, for example shaped or molded from a material similar to the elastomer embodiment of the first damping element 36A, 36B. The second damping element 38A, 38B may occupy the respective rotational clearance fit 33A, 33B, and, furthermore, fill or take up substantially the entire opening defined by the subject rotational clearance fit. The damping provided by the first and/or second damping elements 36A, 36B and 38A, 38B is intended to have the effect of controlling, such as reducing or restricting twisting oscillations of the inner shaft 30A, 30B with respect to the hollow cylinder 22A, 22B within the respective first axle-shaft 16A and second axle-shaft 16B. Such damping is produced by dissipation of the energy stored in the subject oscillations.

In the embodiment where the first two-stage stiffness axle-shaft 16A and the second two-stage stiffness axle-shaft 16B include the respective second damping elements 38A, 38B, the damping generated by the selected second damping element 38A of the first inner shaft 30A may be dissimilar from the damping generated by the selected second damping element 38B of the second inner shaft 30B. Therefore, different characteristics specifically selected for the second damping elements 38A, 38B may be used to additionally affect response of the axle-shaft system 16 with respect to minimizing power hop.

Figure 6:
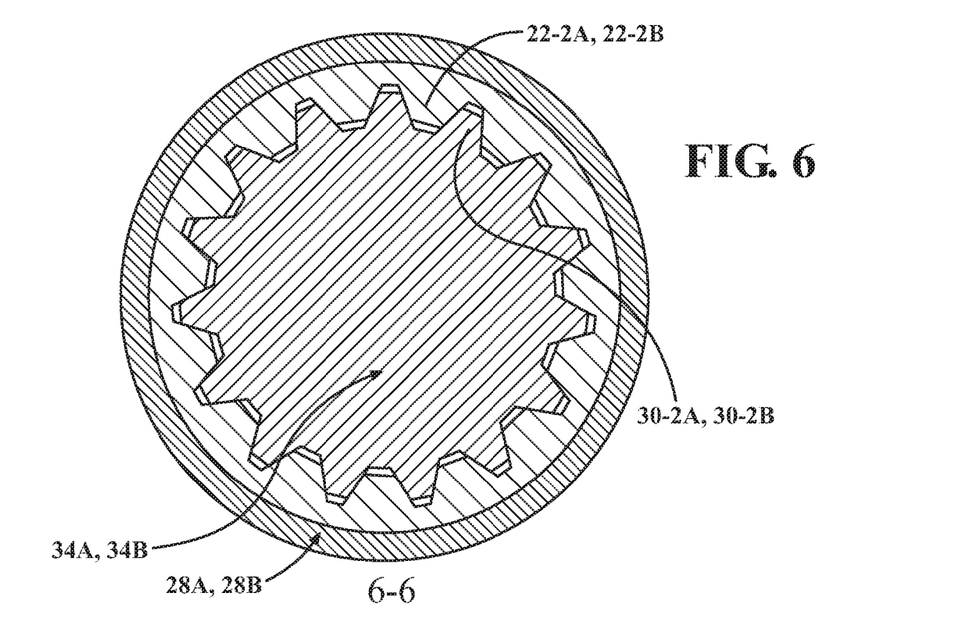
FIG. 6 is a schematic close-up illustration of a section through the second interface between the inner shaft and the hollow cylinder in the representative two-stage stiffness axle-shaft depicted in FIG. 2.

As shown in section 6-6 illustrated in FIG. 6, the second end 34A, 34B of the inner shaft 30A, 30B may include a respective second outer spline 30-2A, 30-2B and the second end 28A, 28B of the hollow cylinder 22A, 22B may include a second inner spline 22-2A, 22-2B. Each second outer spline 30-2A, 30-2B may be press-fit into the second inner spline 22-2A, 22-2B at a respective second interface 37A, 37B to thereby establish the rotationally fixed connection of the second end 34A, 34B to the second end 28A, 28B. An alternative construction of the second interface 37A, 37B may include the second end 34A, 34B of the inner shaft 30A, 30B being welded to the second end 28A, 28B of the hollow cylinder 22A, 22B, whether or not employing the second inner and outer splines 22-2A, 22-2B and 30-2A, 30-2B.

Accordingly, each of the elastomer and the friction component embodiments of the first damping element 36 may be employed for appropriate respective hysteresis, 46A, 46B, for consistent damping when the input torque T is being filtered by the first-stage stiffness S1A, S1B of the respective axle-shaft 16A, 16B through the predetermined angle θ. Furthermore, the first-stage stiffness S1A, S1B and the friction damping are together configured to attenuate variation in the input power-plant torque T that is to be transmitted by the respective first and second axle-shafts 16A, 16B, and thus reduce potential vibration in the drive-train of the vehicle 10. The first-stage stiffness S1A, S1B, in combination with the attendant friction damping, is primarily intended to provide effective filtering of high-amplitude and low-frequency oscillations in power-plant torque T, such as may be encountered during vehicle cruising conditions.

On the other hand, the second-stage stiffness S2A, S2B is intended to provide reduced axle-shaft 16A, 16B compliance for vehicle acceleration under high power-plant torque T, such as at wide-open-throttle. Furthermore, a transition 48, between the first-stage stiffness S1A, S1B and second-stage stiffness S2A, S2B, as shown in FIG. 7, is controlled by the damping provided by the respective hysteresis 46A or 46B provided via the first damping element 36A, 36B of either embodiment disclosed above. As discussed above, the hysteresis 46A, 46B is primarily intended to reduce oscillation amplitude when the axle-shaft 16A, 16B is operated in the first-stage, i.e., at stiffness S1A, S1B, which may take place during high amplitude transient maneuvers.

The transition 48 between the first-stage stiffness S1A, S1B and the second-stage stiffness S2A, S2B is intended to facilitate control of transient torque oscillations that can take place as operation of the vehicle 10 shifts between drive and coast torque during various vehicle maneuvers. For example, such transient torque oscillations may be generated when the direction of torque transmitted by the driveshaft switches from the engine torque T driving the vehicle 10 to the vehicle inertia back-driving the drive-train and generating engine braking. Additionally, subject transient torque oscillations may result from increased torsional vibrations generated by an engine with some of its cylinders deactivated, for example if two cylinders in a four cylinder engine are deactivated for enhanced fuel efficiency.

Consequently, the two-stage stiffness axle-shaft system 16 provides asymmetrical stiffness or side-to-side stiffness bias, between the two axle-shafts 16A and 16B. Such side-to-side stiffness bias, along with the dissimilar damping provided in the two axle-shafts 16A, 16B, is intended to control undesirable response of the axle-shaft system 16, such as power hop, to torque input T from the power-plant 12 during operation of the vehicle 10, as shown in FIG. 8. Specifically, the graph in FIG. 8 illustrates asymmetrical torsional response from the respective two-stage stiffness axle-shafts 16A, 16B as a function of time under typical power hop conditions.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An axle-shaft system for transmitting an input torque in a drive-train of a motor vehicle, the axle-shaft system comprising:
    a first two-stage stiffness axle-shaft and a second two-stage stiffness axle-shaft;
    wherein each of the first two-stage stiffness axle-shaft and the second two-stage stiffness axle-shaft includes:
        a hollow cylinder defined by a longitudinal axis, a first end, and a distal second end, and having a hollow cylinder stiffness; and an inner shaft extending through the hollow cylinder along the longitudinal axis and defined by a first end, and a distal second end, and having an inner shaft stiffness;

wherein each of the first two-stage stiffness axle-shaft and the second two-stage stiffness axle-shaft is constructed such that:

the first end of the respective inner shaft is engaged with the first end of the respective hollow cylinder via a rotational clearance fit;

the second end of the respective inner shaft is rotationally fixed to the second end of the respective hollow cylinder such that the first end of the inner shaft will twist to a predetermined angle with respect to the second end of the inner shaft in response to the input torque; and the inner shaft stiffness defines a first-stage stiffness of the axle-shaft and the inner shaft stiffness together with the hollow cylinder stiffness defines a second-stage stiffness of the axle-shaft; and wherein at least one of the first-stage stiffness and the second-stage stiffness of the first axle-shaft is dissimilar from the respective one of the first-stage stiffness and the second-stage stiffness of the second axle-shaft.

2. The two-stage stiffness axle-shaft system of claim 1, wherein the stiffness of the first inner shaft is dissimilar from the stiffness of the second inner shaft.

3. The two-stage stiffness axle-shaft system of claim 1, wherein the stiffness of the first hollow cylinder is dissimilar from the stiffness of the second hollow cylinder.

4. The two-stage stiffness axle-shaft system of claim 1, wherein at least one of the first two-stage stiffness axle-shaft and the second two-stage stiffness axle-shaft also includes a first damping element arranged between the inner shaft and the hollow cylinder and configured to control variation in the input torque transmitted by the axle-shaft via generated damping, and wherein the first damping element is configured to generate a gradual transition between the first-stage stiffness and the second-stage stiffness.

5. The two-stage stiffness axle-shaft system of claim 4, wherein when each of the first two-stage stiffness axle-shaft and the second two-stage stiffness axle-shaft includes the respective first damping element, the damping generated by the first damping element of the first inner shaft is dissimilar from the damping generated by the first damping element of the second inner shaft.

6. The two-stage stiffness axle-shaft system of claim 4, wherein at least one of the first two-stage stiffness axle-shaft and the second two-stage stiffness axle-shaft is constructed such that:

the first end of the inner shaft includes a first outer spline and the first end of the hollow cylinder includes a first inner spline; and the first outer spline is engaged with the first inner spline via the rotational clearance fit at a first interface.

7. The two-stage stiffness axle-shaft system of claim 6, wherein:

at least one of the first two-stage stiffness axle-shaft and the second two-stage stiffness axle-shaft also includes a second damping element arranged between the first outer spline and the first inner spline; and the second damping element is an elastomer component occupying the rotational clearance fit and configured to control variation in the input torque transmitted by the axle-shaft at the first interface via generated damping.

8. The two-stage stiffness axle-shaft system of claim 7, wherein when each of the first two-stage stiffness axle-shaft and the second two-stage stiffness axle-shaft includes the respective second damping element, the damping generated by the second damping element of the first inner shaft is dissimilar from the damping generated by the second damping element of the second inner shaft.

9. The two-stage stiffness axle-shaft system of claim 4, wherein at least one of the first two-stage stiffness axle-shaft and the second two-stage stiffness axle-shaft is constructed such that:

the second end of the inner shaft includes a second outer spline and the second end of the hollow cylinder includes a second inner spline; and the second outer spline is press-fit into the second inner spline at a second interface.

10. The two-stage stiffness axle-shaft of claim 1, wherein at least one of the first two-stage stiffness axle-shaft and the second two-stage stiffness axle-shaft is constructed such that the second end of the inner shaft is welded to the second end of the hollow cylinder.

11. A drive-train for a motor vehicle comprising:

a power-plant configured to generate torque;

a first road wheel and a second road wheel;

a differential configured to receive the torque from the power-plant; and an axle-shaft system operatively connected to and configured to transmit the torque from the differential to the first and second road wheels, the axle-shaft system including:

a first two-stage stiffness axle-shaft configured to transmit a portion of the torque to the first road wheel and a second two-stage stiffness axle-shaft configured to transmit another portion of the torque to the second road wheel;

wherein each of the first two-stage stiffness axle-shaft and the second two-stage stiffness axle-shaft includes:

a hollow cylinder defined by a longitudinal axis, a first end, a distal second end, and having a hollow cylinder stiffness; and an inner shaft extending through the hollow cylinder along the longitudinal axis and defined by a first end, a distal second end, and having an inner shaft stiffness;

wherein each of the first two-stage stiffness axle-shaft and the second two-stage stiffness axle-shaft is constructed such that:

the first end of the respective inner shaft is engaged with the first end of the respective hollow cylinder via a rotational clearance fit;

the second end of the respective inner shaft is rotationally fixed to the second end of the respective hollow cylinder such that the first end of the inner shaft will twist to a predetermined angle with respect to the second end of the inner shaft in response to the input torque; and the inner shaft stiffness defines a first-stage stiffness of the axle-shaft and the inner shaft stiffness together with the hollow cylinder stiffness defines a second-stage stiffness of the axle-shaft; and wherein at least one of the first-stage stiffness and the second-stage stiffness of the first axle-shaft is dissimilar from the respective one of the first-stage stiffness and the second-stage stiffness of the second axle-shaft.

12. The drive-train of claim 11, wherein the stiffness of the first inner shaft is dissimilar from the stiffness of the second inner shaft.

13. The drive-train of claim 11, wherein the stiffness of the first hollow cylinder is dissimilar from the stiffness of the second hollow cylinder.

14. The drive-train of claim 11, wherein at least one of the first two-stage stiffness axle-shaft and the second two-stage stiffness axle-shaft also includes a first damping element arranged between the inner shaft and the hollow cylinder and configured to control variation in the input torque transmitted by the axle-shaft via generated damping, and wherein the first damping element is configured to generate a gradual transition between the first-stage stiffness and the second-stage stiffness.

15. The drive-train of claim 14, wherein when each of the first two-stage stiffness axle-shaft and the second two-stage stiffness axle-shaft includes the respective first damping element, the damping generated by the first damping element of the first inner shaft is dissimilar from the damping generated by the first damping element of the second inner shaft.

16. The drive-train of claim 14, wherein at least one of the first two-stage stiffness axle-shaft and the second two-stage stiffness axle-shaft is constructed such that:
the first end of the inner shaft includes a first outer spline and the first end of the hollow cylinder includes a first inner spline; and
the first outer spline is engaged with the first inner spline via the rotational clearance fit at a first interface.

17. The drive-train of claim 16, wherein:
at least one of the first two-stage stiffness axle-shaft and the second two-stage stiffness axle-shaft also includes a second damping element arranged between the first outer spline and the first inner spline; and
the second damping element is an elastomer component occupying the rotational clearance fit and configured to control variation in the input torque transmitted by the axle-shaft at the first interface via generated damping.

18. The drive-train of claim 17, wherein when each of the first two-stage stiffness axle-shaft and the second two-stage stiffness axle-shaft includes the respective second damping element, the damping generated by the second damping element of the first inner shaft is dissimilar from the damping generated by the second damping element of the second inner shaft.

19. The drive-train of claim 14, wherein at least one of the first two-stage stiffness axle-shaft and the second two-stage stiffness axle-shaft is constructed such that:
the second end of the inner shaft includes a second outer spline and the second end of the hollow cylinder includes a second inner spline; and
the second outer spline is press-fit into the second inner spline at a second interface.

20. The drive-train of claim 11, wherein at least one of the first two-stage stiffness axle-shaft and the second two-stage stiffness axle-shaft is constructed such that the second end of the inner shaft is welded to the second end of the hollow cylinder.

* * * * *